(No Model.)  2 Sheets—Sheet 1.

J. COOK.
Baling-Press.

No. 228,515. Patented June 8, 1880.

Witnesses
Frank A. Brooks
Geo. H. Strong

Inventor
John Cook
By Dewey & Co.
Atty (No Model.) 2 Sheets—Sheet 2.

J. COOK.
Baling-Press.

No. 228,515. Patented June 8, 1880.

Witnesses
Frank A. Brooke
Geo. H. Strong

Inventor
John Cook
By Dewey & Co.
Attys

UNITED STATES PATENT OFFICE.

JOHN COOK, OF HEALDSBURG, CALIFORNIA.

BALING-PRESS.

SPECIFICATION forming part of Letters Patent No. 228,515, dated June 8, 1880.

Application filed March 8, 1880. (No model.)

*To all whom it may concern:*

Be it known that I, JOHN COOK, of Healdsburg, county of Sonoma, and State of California, have invented an Improved Baling-Press; and I hereby declare the following to be a full, clear, and exact description thereof.

My invention relates to certain improvements in presses for baling hay and other loose materials; and it consists in the employment of a horizontal box having a follower operated by a peculiar windlass or capstan and ropes and pulleys which are placed along the sides of the box.

It also consists in a novel method of holding and tightening the baling-ropes while the follower is moving up, so that they are all ready to be tied when the bale is pressed. A lever is fitted to the press, by which the bale may be ejected as soon as finished.

My invention also consists in certain details of construction, which will be more fully described by referring to the accompanying drawings, in which—

Figure 1:
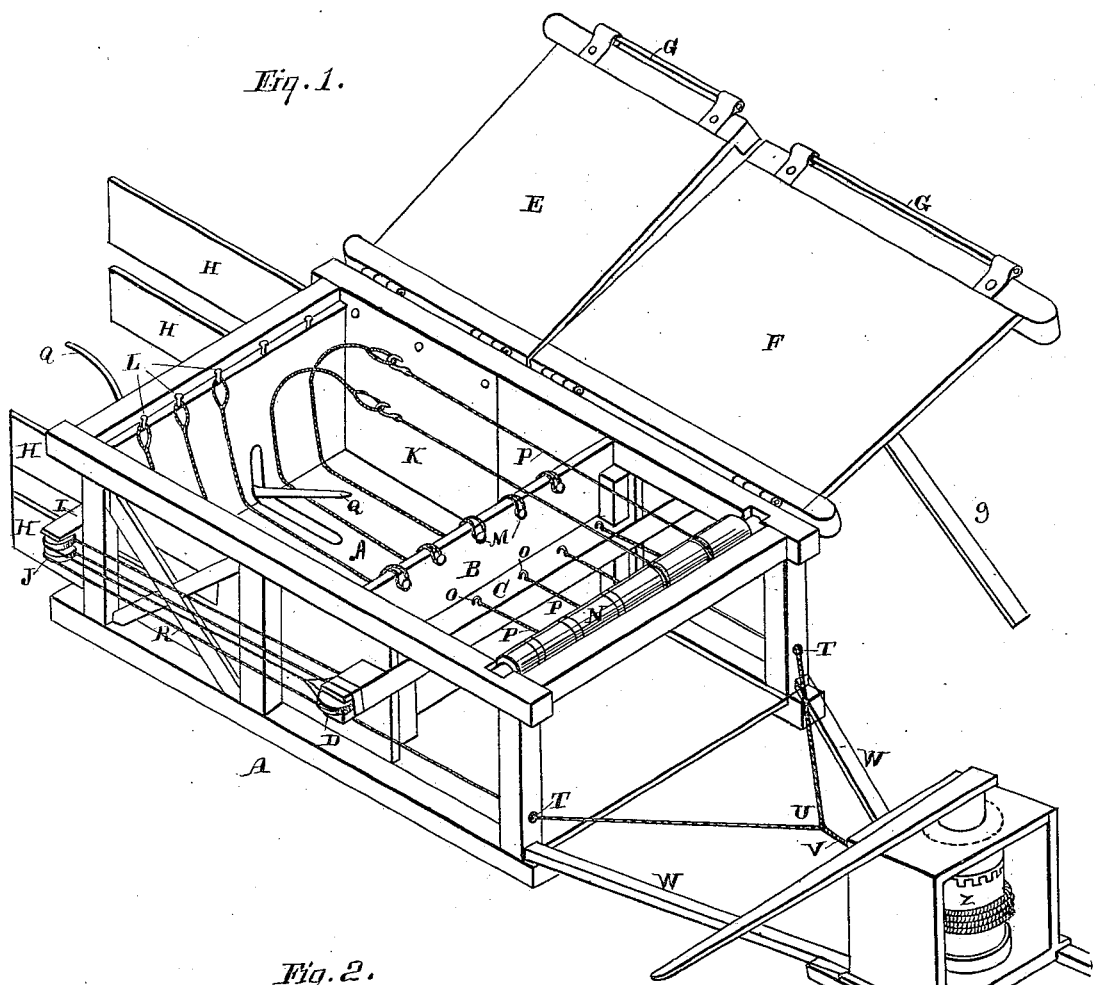
Figure 2:
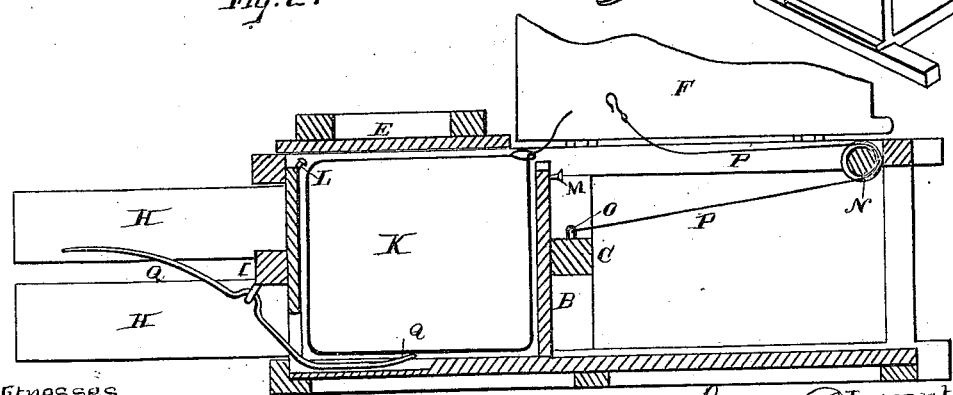
Figure 5:
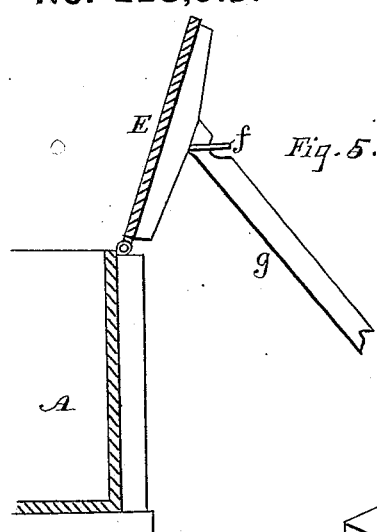
Figure 3:
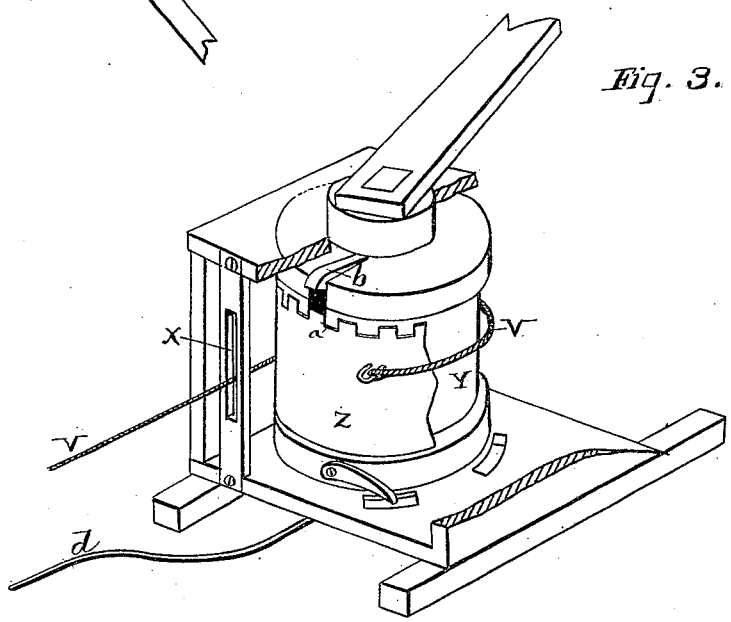
Figure 4:
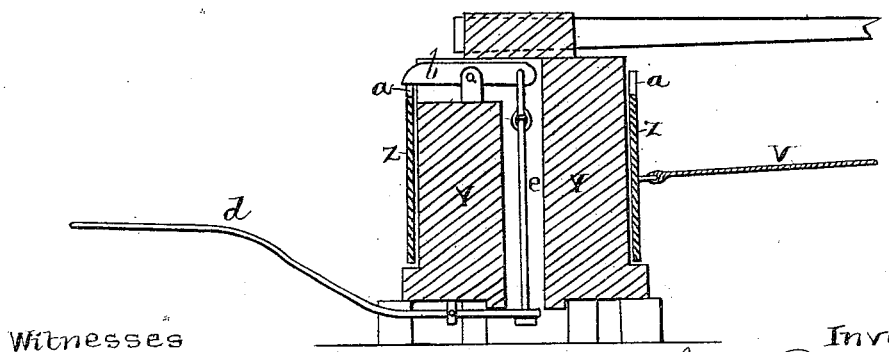

Figure 1 is a view of my press open. Fig. 2 shows the press with the follower thrown forward to press a bale. Figs. 3 and 4 show the construction of the operating-capstan. Fig. 5 shows a lever for holding the doors when open.

A is the body of my press, which consists of a horizontally-placed box of a width and depth equal to the length and thickness of a bale in two directions, and B is the follower by which the bale is to be compressed. This follower consists of a sufficiently strong framework of plank and timber, formed in the usual or any suitable manner, of a size to fit and move in the box A, and having a centrally-placed bar or timber, C, the ends of which extend sufficiently to each side of the box to receive one or more pulley-wheels, D, through which the operating-ropes will pass.

The bottom of my press is solid and secured to the frame-timbers. The top consists of two hinged doors, one of which, E, closes over that portion of the press which is occupied by the bale after it is pressed, while the other door, F, covers the remainder of the box. These doors have suitable locking hasps or clamps at G, which may be made in any desired form, no particular clamps being here shown.

The sides H of my press are secured to the follower so as to move with it, and they are slotted at the end opposite the follower to about half their length, to allow them to pass the beam I, which is secured to the rear end of the press, and projects at each side to correspond with the beam C and receive the pulley J. That portion of the interior of the press which corresponds with the size of the finished bale has the sides lined with sheet metal, K, and the movable sides pass behind these sheet-metal plates. The slotted portions of the sides never move so far when the press is opened as to expose the slotted portions inside the body of the press, and none of the material to be pressed will ever get into the slots to clog the press in any way.

The end of the press which is opposite to the follower is fixed, and has small hooks or pins L at its upper edge, corresponding with the number of baling-ropes to be used, and these latter have loops at one end, which are attached to the pins L. The follower has corresponding pins M upon its outer edge and a notch for each, so that the other ends of the baling-ropes may be passed around the pins and laid in the notches, the ropes passing thence down inside the follower, along the bottom of the press, and up at the opposite end to the hooks L. When the complete number of baling-ropes are thus in position the hay may be thrown into the press without disarranging them.

Outside the follower, at what I term the "front end" of the press, is mounted a roller, N, at the top of the frame of the press, and this roller has a groove opposite each baling-rope. Hooks or eyes O of sufficient strength are secured to the timber C, so that ropes or cords P may have one end fastened to these hooks. These cords are then carried over the roller N and across the top of the material to be baled after the press is filled and before the doors are closed. The loops of the baling-ropes are detached from the hooks or pins L at the rear end and attached to the hooks at the ends of the cords P.

The operation will then be as follows: The follower being drawn forward until the press is fully open, the baling-ropes are placed as before described, and the press is filled with the material to be baled. The cords P are then carried across the top and connected with the looped ends of the baling-ropes. The doors E and F are closed and fastened, and the follower is caused to compress the bale, as will be hereinafter described.

As the follower moves back in the press it draws the cords P, which are secured to it, and these cords pull the baling-ropes across the bale, taking up the slack in the bottom of the press caused by the movement of the follower, and when the follower is fully back and the bale pressed the looped ends of the baling-ropes will have been brought to a point opposite the ends which are secured to the top of the follower. The door F is then opened, and the ends of the baling-rope are detached from the follower and from the cords P and tied.

The door E does not cover quite all the space occupied by the compressed bale, and there is therefore sufficient space at this point to tie the ropes without difficulty. The door E is then opened and the follower is run forward, leaving the bale free.

As the movable sides H pass behind the plates K there will be no clogging, and when completed the bale will lie between these plates. In order to eject the bale from the press I employ a lever, Q. This lever passes through the fixed end of the press, and is bent so that the portion within the press lies in a groove at the bottom and out of the way while the bale is being formed.

After the bale is completed and tied and the door E is opened the lever may be operated from the outside, and the bale will be thrown up, so that it can be easily rolled out of the press.

The follower is operated by ropes R, which pass around the pulleys D J, which are fixed in the ends of the timbers C of the follower and I at the rear of the press, so that when operated sufficient power is developed to draw the follower back and press the bale. These ropes are carried along the sides of the press entirely out of the way, and pass through holes or over guiding-pulleys at T, from which point they are united at U, so as to receive a single operating-rope, V. This rope leads to the capstan, which, while it may be secured directly to the press-frame, is preferably set upon the ground at a short distance in front of the press, and timbers W extend from it to the press, so that all strain upon the capstan and press acts from one to the other, as if they were in one frame. In addition to this, both press and capstan may be staked down securely.

The rope V passes through the guiding-slot X and around the vertical cylinder, forming the capstan.

The inner cylinder, Y, is surrounded by a loose sleeve, Z, which turns freely upon it. To this sleeve the rope V is secured. In order to wind the rope by rotating the inner cylinder, Y, the sleeve is connected with it by a clutch which is formed by notching the upper end of the sleeve at a.

A pawl, b, has one end pivoted within the cylinder or barrel Y, and the other end is allowed to fall into the notches a of the sleeve. When the barrel Y is turned by horse or other power, and the pawl b engages the notches a, the rope V will be coiled upon the sleeve Z and the follower will thus be forced back by the action of its ropes and pulleys until the bale is fully compressed.

In order to relieve the follower after the bale is tied, and allow it to move forward by the elasticity of the bale acting upon it, the pawl b is thrown out of the notches a, and this allows the sleeve to revolve freely and independently of the inner cylinder or barrel, Y, which remains stationary.

The pawl is actuated by a lever, d, which passes beneath the barrel Y, and is connected with the pawl by a rod, c, and link, so that pressure upon the end of the lever will disengage the pawl and free the sleeve.

After the follower has been forced back as far as the elasticity of the bale will carry it, it can be easily pushed back the remainder of the distance, and the press will then be ready for another bale.

The doors E F have links or loops f upon their backs or tops, and levers g, with beveled toes or points, are slipped into the links, slight grooves upon the backs of the levers holding them in place. By means of these levers the doors are easily opened when the hasps are released, and when opened the ends of the levers will rest upon the ground and form braces, which support the doors in a vertical position.

This press is economically built and operated, and material is easily introduced and bales removed without supplemental doors or severe labor.

The follower may be instantly released and pressure cease, if occasion requires, without stopping the power.

Having thus described my invention, what I claim as new, and desire to secure by Letters Patent, is—

1. The cords P, passing over the roller N, and having one end secured to the follower B, while the opposite ends are adapted to be connected with the ends of the baling-ropes, so that when the follower is moved back the ends of the baling-ropes will be drawn forward over the bale, substantially as herein described.

2. In a baling-press consisting of the horizontal body A, with its doors, as shown, and the follower B, adapted to be moved by the ropes R and pulleys D J, the lever Q, entering the press for operating to raise the bale and eject it after it is finished and the press opened, substantially as herein described.

3. The cylinder Y, with its notched encircling-sleeve Z, in combination with the pawl b, rod c, and lever d, whereby the cylinder and sleeve may be united and rotated to wind up the rope and force the follower back, and the sleeve afterward released to allow the follower to be retracted, substantially as herein described.

4. In a baling-press consisting of the horizontal body A, with its follower B, adapted to move within the body and compress the bale, the ropes R, passing through the pulleys D and J and the guides T, and uniting in one rope, V, in combination with the inner power-cylinder, Y, the loose winding-sleeve Z, the pawl b, and lever d, and the connecting rod or link e, whereby the follower may be forced back or released at any desired point, substantially as herein described.

5. In a baling-press consisting of the horizontal body A, with its movable compressing-follower B and actuating ropes and pulleys, as shown, the independent doors E F, having the loops f and the lever-braces g, with their grooved and beveled toes adapted to fit the loops f, to open the doors and act as braces, substantially as herein described.

In witness whereof I have hereunto set my hand.

JOHN COOK.

Witnesses:
S. H. NOURSE,
FRANK A. BROOKS.